Sept. 4, 1928.

A. E. BEATTIE 1,683,122

ANTISTATIC ARRANGEMENT IN WIRELESS RECEIVING APPARATUS

Filed July 2, 1927

INVENTOR:
Arthur Elliot Beattie
BY: Kwezp, Boyes H Baker
ATTORNEYS

Patented Sept. 4, 1928.

1,683,122

UNITED STATES PATENT OFFICE.

ARTHUR ELLIOT BEATTIE, OF MANZANILLO, CUBA.

ANTISTATIC ARRANGEMENT IN WIRELESS RECEIVING APPARATUS.

Application filed July 2, 1927, Serial No. 203,150, and in Great Britain August 21, 1926.

This invention relates to arrangements for reducing or eliminating the effects of statics in wireless receiving apparatuses.

For this purpose, according to the invention, an iron cored transformer with closed secondary winding, resonant to low audio-frequencies with a parallel capacity capable of passing radio-frequencies but offering a high impedance to audio-frequencies is connected in the aerial circuit of a wireless receiver.

The transformer serves as an audio-frequency wave trap absorbing normal static impulses by heat losses and eddy currents in the core and thus hindering or precluding access thereof to the wireless receiver, whilst the capacity by-passes the signals of radio-frequency thereto, and if variable can be adjusted to act as a capacity in series approximately neutralizing any disturbance of the normal tuning of the set introduced by the audio-frequency transformer.

The primary winding of the transformer is small with a large secondary winding giving a very high step-up ratio. Such secondary winding being closed absorbs the audio-frequencies from the primary winding.

Suitable values for the transformer consist of 160 to 200 turns in the primary winding and 50,000 to 80,000 turns in the secondary winding, wound on a bobbin of an external diameter of 1 inch and a length of 2¼ inches, with a closed iron core.

The parallel capacity may be a fixed or variable condenser. A variable condenser of a maximum value of .0003 microfarads is suitable in this position.

The secondary winding of the transformer may be closed through a condenser of large capacity, .002 microfarads being a suitable value.

The audio-frequency wave trap as above described can be connected in series between an open aerial and the wireless receiver, or included in the circuit of a loop aerial between such loop aerial and the wireless receiver.

The accompanying drawing shows by way of example representative theoretical diagrams of audio-frequency wave traps included in the aerial circuits of wireless receivers, in which:—

Figure 1:
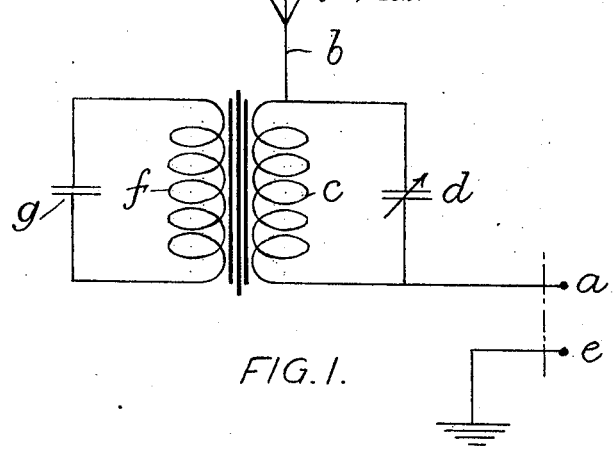
Fig. 1 shows an audio-frequency transformer included in an open aerial circuit of an earthed wireless receiver.

In Fig. 1: $a$ represents the aerial terminal and $e$ the earth terminal of a wireless receiver, the earth terminal $e$ of which is indicated as being directly or indirectly earthed. $b$ is the aerial.

Interposed in series between the aerial $b$ and the aerial terminal $a$, is the primary winding $c$ of an audio-frequency transformer, having the above described characteristics. The primary winding $c$ is shunted by a variable condenser $d$. $f$ is the secondary winding of the transformer. This secondary winding $f$ is closed either conductively or, as shown, by a condenser $g$.

Figure 2:
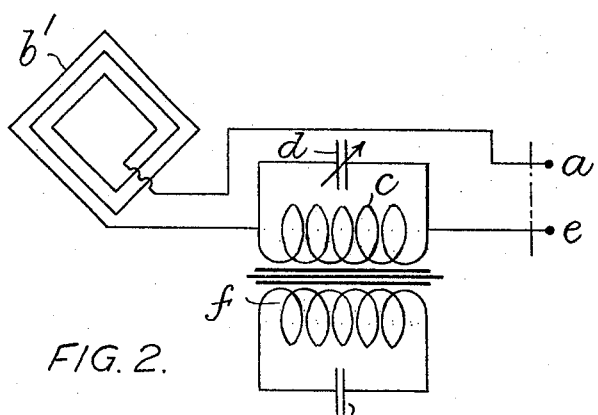
Fig. 2 shows the audio-frequency transformer included in one limb of a loop aerial.

In Fig. 2 the transformer $c$, $f$ with its primary winding $c$ shunted by the variable condenser $d$, is shown interposed in what is termed the earth lead of a loop frame aerial $b^1$. The earth terminal $e$ in this case as usual is not earthed and is the terminal connected to the filament circuits of the set.

Figure 3:
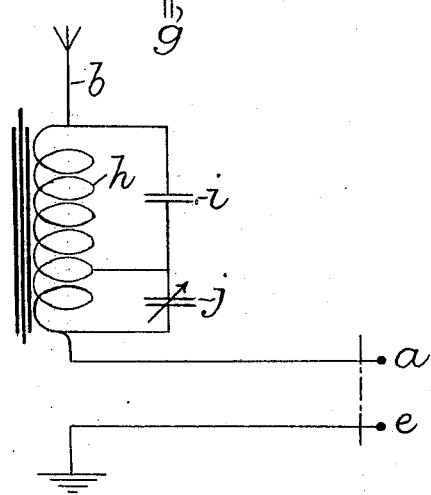
Fig. 3 is similar to Fig. 1 but shows an audio-frequency auto-transformer instead of a transformer with separate windings.

Fig. 3 shows an audio-frequency auto-coupled transformer $h$ interposed in series between the aerial $b$ and the aerial terminal $a$. This auto-transformer $h$ is equivalent to the transformer previously described and therefore, for instance, consists of a winding of 50,000 to 80,000 turns. This winding, with the exception of 160 to 200 turns, is shunted by a condenser $i$ of, for instance, a value of .002 microfarads.

The remaining 160 to 200 turns of the auto-transformer $h$ are shunted by a condenser $j$, which is variable to enable the normal tuning of the receiver to be approximately preserved, and is, for example, of a maximum value of .0003 microfarads.

An ordinary lightning arrester, for instance of the horn type, may be connected to earth across the audio-frequency wave trap and wireless receiver, to safeguard these in the event of a heavy static discharge occurring.

Claims:

1. In a wireless receiving apparatus, an aerial circuit, an iron cored transformer resonant to low audio-frequencies and having a primary winding in series with said aerial circuit and a closed secondary winding, and a capacity capable of passing radio-frequencies but offering a high impedance to audio-frequencies in parallel with said primary winding.

2. In a wireless receiving apparatus, an aerial circuit, an iron cored step-up transformer resonant to low frequencies and having a primary winding of the order of 160 to 200 turns in series with said aerial circuit and a closed secondary winding of the order of 80,000 to 100,000 turns, and a capacity capable of passing radio-frequencies but offering a high impedance to audio-frequencies in parallel with said primary winding.

3. In a wireless receiving apparatus, an aerial circuit, an iron cored step-up transformer resonant to low frequencies and having a primary winding of the order of 160 to 200 turns in series with said aerial circuit and a closed secondary winding of the order of 80,000 to 100,000 turns, and a variable condenser of the order of .0003 microfarads in parallel with said primary winding.

In testimony whereof I have signed my name to this specification.

ARTHUR ELLIOT BEATTIE.